(12) United States Patent
Marquet et al.

(10) Patent No.: US 9,656,635 B2
(45) Date of Patent: May 23, 2017

(54) SCREEN WIPER HAVING AN INTEGRAL SPRAYING DEVICE

(75) Inventors: Chantal Marquet, Brioude (FR); Gilles Petitet, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 651 days.

(21) Appl. No.: 13/805,120

(22) PCT Filed: Jun. 8, 2011

(86) PCT No.: PCT/EP2011/059451
§ 371 (c)(1),
(2), (4) Date: Feb. 27, 2013

(87) PCT Pub. No.: WO2011/160952
PCT Pub. Date: Dec. 29, 2011

(65) Prior Publication Data
US 2013/0152321 A1   Jun. 20, 2013

(30) Foreign Application Priority Data
Jun. 21, 2010   (FR) ..................... 10 02496

(51) Int. Cl.
*B60S 1/38*   (2006.01)
*B60S 1/52*   (2006.01)

(52) U.S. Cl.
CPC ............... *B60S 1/524* (2013.01); *B60S 1/38* (2013.01); *B60S 1/381* (2013.01); *B60S 1/3881* (2013.01); *B60S 1/522* (2013.01)

(58) Field of Classification Search
CPC ............. B60S 1/52; B60S 1/522; B60S 1/381
(Continued)

(56) References Cited

U.S. PATENT DOCUMENTS 2,336,007 A * 12/1943 Fuller ..................... 15/250.04
3,428,992 A *  2/1969 Di Giorgio ............. 15/250.04
(Continued)

FOREIGN PATENT DOCUMENTS

EP   1209050 A2   5/2002
FR   2 929 906 A1  10/2009
(Continued)

OTHER PUBLICATIONS

International Search Report issued in PCT/EP2011/059451 mailed Jul. 13, 2011 (4 pages).
(Continued)

*Primary Examiner* — Michael Jennings
(74) *Attorney, Agent, or Firm* — Osha Liang LLP

(57) ABSTRACT

The invention relates to a screen wiper (1) for a motor vehicle screen (6) comprising a support frame (2) of principal longitudinal orientation, having lower means exhibiting a wiper blade (4), the said support frame (2) being intended to be caused to move between two end positions along a predetermined trajectory in a wiping cycle of the screen (6), and a device (7, 8) for spraying cleaning liquid comprising at least one first set of spraying orifices aligned in the said principal longitudinal orientation for at least one part of a first side of the wiper in such a way as to permit the spraying of washing liquid in front of the wiper in relation to the wiping movement.

According to the invention, the spraying orifices are distributed over the said first side with a non-constant spacing, the distance separating two successive orifices being selected in such a way that the portion of the surface of the screen that is effectively sprayed by a spraying orifice in the course of a wiping cycle is substantially equal to the same target value for all the spraying orifices of the first set.

7 Claims, 4 Drawing Sheets

(58) Field of Classification Search
USPC ............. 15/250.04, 250.361, 250.07, 250.48
See application file for complete search history.

(56) References Cited

U.S. PATENT DOCUMENTS

| | | | | |
|---|---|---|---|---|
| 3,887,956 | A * | 6/1975 | Wind ......................... | 15/250.04 |
| 5,291,627 | A * | 3/1994 | Liou .......................... | 15/250.04 |
| 2005/0274398 | A1* | 12/2005 | Fonville et al. ................ | 134/34 |
| 2007/0226938 | A1* | 10/2007 | Yon ............................ | 15/250.04 |
| 2010/0037415 | A1 | 2/2010 | Lansinger | |
| 2011/0047738 | A1* | 3/2011 | Gross et al. ............... | 15/250.04 |

FOREIGN PATENT DOCUMENTS

| | | |
|---|---|---|
| FR | 2 929 907 A1 | 10/2009 |
| JP | 63 152759 U | 10/1988 |
| JP | 3008142 B2 | 3/1995 |
| WO | 2007/000346 A1 | 1/2007 |
| WO | 2010/006775 A1 | 1/2010 |

OTHER PUBLICATIONS

Office Action in counterpart Japanese Patent Application No. 2013-515810, dated May 29, 2015 (5 pages).

* cited by examiner

SCREEN WIPER HAVING AN INTEGRAL SPRAYING DEVICE

The present invention relates to screen wipers for a motor vehicle screen having an integrated device for spraying liquid.

The present invention relates more specifically to screen wipers comprising a support frame of principal longitudinal orientation, having lower means for the support of a wiper blade, the said support frame being intended to be caused to move between two end positions along a predetermined trajectory during a wiping cycle of the screen, and a device for spraying cleaning liquid comprising at least one first set of spraying orifices aligned in the said principal longitudinal orientation for at least one part of a first side of the wiper in such a way as to permit the spraying of washing liquid in front of the wiper in relation to the wiping movement.

In the case of certain previously disclosed wipers, improved cleaning of the screen is obtained by making provision to supply the washing liquid alternatively from one side or the other of the wiper, depending on whether the wiper is moving towards its position known as "opposed fixed stop" (for example from bottom to top in the case of a conventional circular or elliptical trajectory of the wiper in the course of a wiping cycle), or towards its position known as "fixed stop" (from top to bottom for a circular or elliptical trajectory), in such a way that the liquid effectively sprays a portion of the screen which will then be wiped immediately by the screen wiper. For this purpose, the spraying device comprises not only a single set, but two sets of spraying orifices in the form of two ramps arranged to either side of the wiper. A wiper of this type is described, for example, in document WO2007/000346 in the name of the applicant.

Thus, in the case of previously disclosed wipers of the flat wiper type, which are also referred to as "flat-blades" in Anglo-Saxon terminology, the support frame of principal longitudinal orientation consists of a tubular body having a principal longitudinal axis, inserted into the interior of which is a spine in the form of a longitudinal horizontal strip. FIG. 1 illustrates a transversal section through an illustrative embodiment of such a wiper 1 equipped with a bi-ramp spraying device. In this figure, the support frame bears the reference 2, the spine bears the reference 3 and the wiper blade bears the reference 4, with a part 5 intended to rest against the screen 6 during the wiping cycle represented by the displacement indicated by the arrows A and B. The integral support also has a part forming a deflector, inside which two channels 7 and 8 for supplying washing fluid are provided to either side of the wiper. Spraying orifices are provided along these two channels. Thus, the spraying orifices of the channel 7 permit the spraying of jets 9A when the wiper is displaced in the direction of the arrow A, and the spraying orifices of the channel 8 permit the spraying of jets 9B when the wiper is displaced in the direction of the arrow B.

Attention is paid more particularly below to the arrangement of the spraying orifices on one side (mono-ramp device) or on the two sides (two-ramp device) of the screen wiper.

At the time of designing a screen wiper having an integrated washing function, it is important to be able to satisfy the following three requirements that are expected by the driver of the vehicle:
elimination of dust and dirt;
uniform spraying of the cleaning liquid;
good visibility, including during the wiping and washing cycle.

The washing efficiency associated with a wiper equipped with a mono-ramp or a bi-ramp spraying system may be characterized by two physical quantities:
the cleaning force: this is the force induced by the contact between the jet of cleaning liquid and the screen. It must be as great as possible so as to permit the loosening of any impurities adhering to the screen.
the rate of spread: this is the time taken by the liquid to spread over the screen. It must be sufficiently high for the liquid projected at the level of a spraying orifice to have sufficient time, before passage of the wiper, to form a patch possessing an interaction (overlapping zone) with the patch created by the neighbouring orifice situated on the same ramp in the course of the movement of the wiper.

Furthermore, the patch discharged from each spraying orifice must not be too large, in order not to impair the visibility of the driver.

In light of the above, it can be seen that the separation interval between two orifices of a ramp constitutes a significant physical quantity.

In the case of previously disclosed wipers, such as those described for example in the aforementioned document, the interval between the spraying orifices of the same ramp is constant.

Furthermore, even if a number of systems provide for the wiper to be displaced parallel to itself from one side to the other of the screen according to a rectilinear trajectory movement, the majority of wiping systems propose for the wiper to be driven according to a circular or elliptical trajectory movement. The choice that has been taken until now, based on the arrangement of the spraying orifices according to a uniform distribution, does not permit sufficiently efficient cleaning to be obtained for this type of wiper. In fact, in the course of a wiping cycle, the distance covered by each point of the wiper, and in particular by each spraying orifice, is not the same for all the points. Thus, if the same quantity of water per unit of time is projected onto the windscreen, the washing efficiency will not be the same at the top and at the bottom of the wiper. Furthermore, the linear speed of displacement of one point of the wiper during a circular or elliptical wiping movement is greater for a point situated at the top of the wiper than for a point situated at the bottom of the wiper. Thus, when the interval between the spraying orifices is selected with a constant value, the aforementioned rate of spread will be smaller for the spraying orifices situated at the top of the wiper, and the resulting zone of coverage for two neighbouring orifices will also be smaller than for two neighbouring orifices situated at the bottom of the wiper.

The object of the present invention is to overcome the aforementioned disadvantages by proposing a screen wiper providing the same wiping and washing efficiency at every point of the wiper.

In order to do this, the object of the present invention is a screen wiper for a motor vehicle screen comprising a support frame of principal longitudinal orientation, with lower means of support for a wiper blade, the said support frame being intended to be caused to move along a predetermined trajectory during a screen wiping cycle between two end positions, and a device for spraying cleaning liquid comprising at least a first set of spraying orifices aligned in the said principal longitudinal orientation on at least one part of a first side of the wiper in such a way as to permit the spraying of washing liquid in front of the wiper in relation to the wiping movement, characterized in that the spraying orifices are distributed over the said first side with a non-constant spacing, the distance separating two successive orifices being selected in such a way that the portion of the surface of the screen that is effectively sprayed by a spraying orifice in the course of a wiping cycle is substantially equal to the same target value for all the spraying orifices of the first set.

In a preferred embodiment, in which the spraying system is of the bi-ramp type, the wiper additionally consists of a second set of spraying orifices aligned in the said principal longitudinal orientation over at least one part of a second side of the wiper opposite the said first side, and the spraying orifices of the second set are distributed over the said second side with a non-constant spacing, the distance separating two successive orifices being selected in such a way that the portion of the surface of the screen that is effectively sprayed via a spraying orifice in the course of a wiping cycle is substantially equal to the same target value for all the spraying orifices of the second set.

In this case, over the part of the first side and the second side of the wiper, the spraying orifices of the first set are alternated, depending on the principal longitudinal orientation, with the orifices of the second set.

The present invention and the advantages that it brings will be better understood in light of the following description given with reference to the accompanying figures, in which:

FIG. 1, as already described, represents in transversal section a possible wiper configuration to which the present invention may be applied;

The invention is based on the principle that the same efficiency of washing and wiping can be obtained at any spraying orifice of the wiper, even if the orifices do not cover the same distance during the displacement of the wiper along a predetermined trajectory during a wiping cycle, by providing for the spraying orifices to be distributed on one side of the wiper with a non-constant spacing, calculated for each orifice in such a way that the portion of the surface of the screen that is effectively sprayed via a spraying orifice in the course of a wiping cycle is substantially equal to the same target value for all the spraying orifices of the first set.

Figure 1:
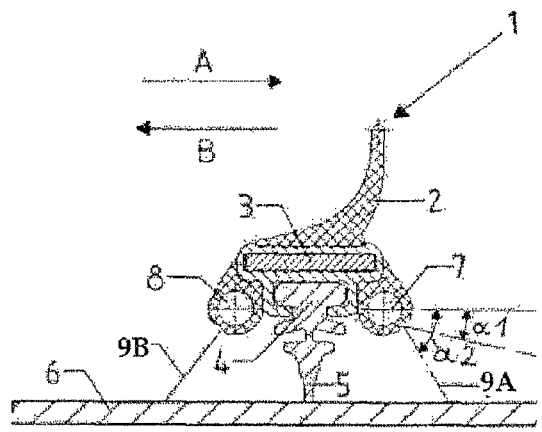
Figure 2:
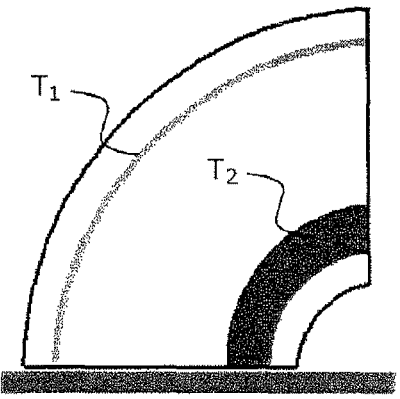
FIG. 2 illustrates schematically two traces of the sprays obtained on half a wiping cycle for a wiper that is caused to move over a screen according to an elliptical trajectory movement, for two spraying orifices situated on the same side, respectively at the top and at the bottom of the wiper.

Represented in FIG. 1, in the non-restrictive case of the wiper with circular or elliptical displacement, are two traces $T_1$ and $T_2$ each corresponding to the portion of the effectively sprayed surface of the screen that it is wished to obtain for an orifice situated respectively in the top end part and in the bottom end part of the wiper. These two traces do not possess the same width, although they do exhibit an individual width such that, according to the invention, the surface occupied by the trace $T_1$ is substantially the same as the surface occupied by the trace $T_2$.

The tests conducted by the applicant have made it possible to demonstrate that the surface covered by each spraying orifice situated on the same side of a wiper of this type is equal to a constant K for all the points solving the following equation system:

$$D_i \times \Delta x_i = K$$
$$D_i = a x_i + b$$
$$\Delta x_i = x_i - x_{i-1}$$
$$\sum_{j=0}^{N} \Delta x_i = x_N - x_0 = L'$$

in which K is the target value for the constant portion of the surface that is being sought, $x_i$ corresponds to the position of an orifice along the principal longitudinal orientation of the wiper, $\Delta x_i$ is the distance separating two consecutive spraying orifices on the wiper, N+1 is the total number of spraying orifices on the same side of the wiper, and L' is the length of the part of the side of the wiper on which it is wished to distribute the orifices.

This system of equations gives expression in mathematical form to the fact that what is being sought is the same portion of the spraying surface K for each spraying orifice in the position $x_i$, given that the distance $D_i$ covered by each orifice in the position $x_i$ varies linearly as a function of the position $x_i$.

Figure 3:
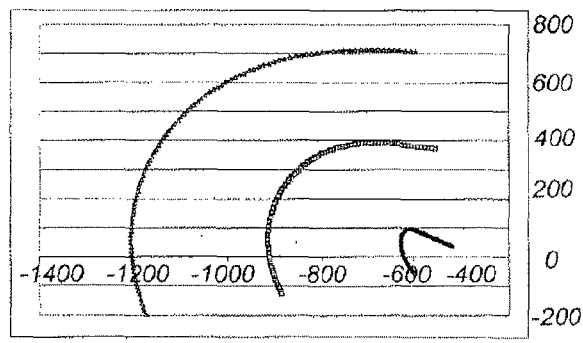
FIGS. 3 and 4 illustrate the results of simulation validating the principle of the invention when applied to a wiper adapted to be displaced according to a circular or elliptical trajectory movement.

FIG. 3 represents the trajectory of three points on a wiper projected in a plane (the trajectory of a point of the wiper being in practice inside a three-dimensional space) for an elliptical wiping system. This figure shows the evolution of the difference in length covered by the points of the wiper for a non-circular trajectory.

Figure 4:
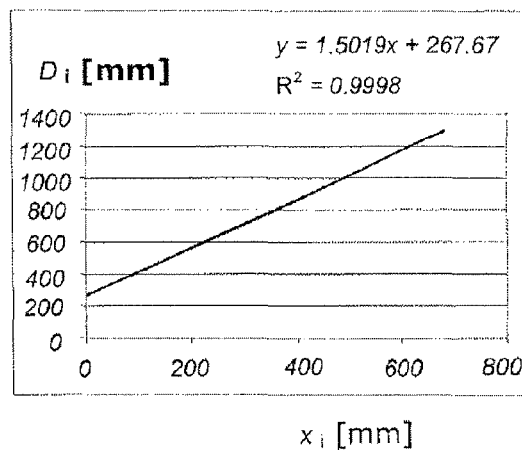
Figure 5A:
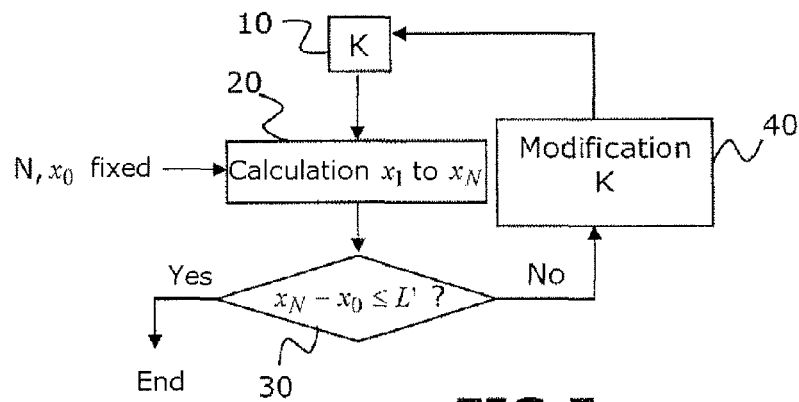
FIGS. 5a to 5c represent, in the form of synoptic diagrams, three possible computational algorithms for the positioning of the spraying orifices on the same side of the wiper according to the principles of the invention.
Figure 5B:
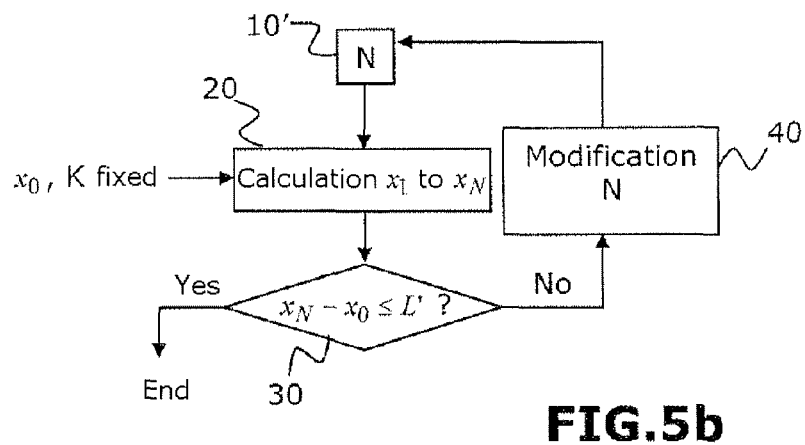
Figure 5C:
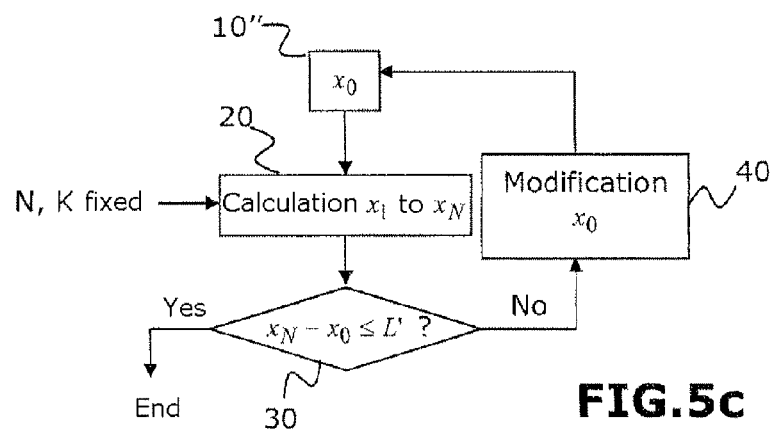

The curve represented in FIG. 4 illustrates the variations in the distance $D_i$ as a function of the position $x_i$ obtained by simulation. The resulting straight line thus validates the fact that the distance $D_i$ varies linearly as a function of the position $x_i$. It should be noted that this hypothesis remains valid in the case of elliptical trajectories.

The previous system of equations may be expressed as follows:

$$(a x_i + b) \times (x_i - x_{i-1}) = K$$
$$\sum_{j=0}^{N} \Delta x_i = x_N - x_0 = L'$$

or:

$$a x_i^2 - a x_i x_{i-1} + b x_i - b x_{i-1} = K$$
$$\sum_{j=0}^{N} \Delta x_i = x_N - x_0 = L'$$

This equation of the second degree in $x_i$ may be solved with different algorithms:

According to a first possible algorithm, of which the steps are outlined in FIG. 4a, on the one hand (step 10) a first possible value for K is chosen, and on the other hand the total number N+1 of holes that it is wished to have on one side of the wiper, and the position $x_0$ of the first hole starting from one end of the wiper, are fixed. It is then possible to calculate (step 20) the set of values $x_1$ to $x_N$ as a solution to the system of equations. A check is then made (step 30) to establish whether the last value $x_N$ is indeed consistent with the length L', that is to say if $$x_N - x_0 \leq L'$$

If this is not the case, the value of K is changed (step 40) and the calculation of the different positions $x_1$ to $x_N$ is repeated until a consistency is obtained with the length L'.

According to a second possible algorithm, of which the steps are outlined in FIG. 4b, the value of K and the position $x_0$ of the first hole are imposed, (step 10') a first value is selected for N, and it is then the number N+1 of holes that will be modified (step 40') until positions $x_1$ to $x_N$ are obtained in consistency with the length L'. The calculation steps 20 and 30 are identical to those set out with reference to FIG. 4a.

Finally, according to a third possible algorithm, of which the steps are outlined in FIG. 4c, the values of K and N+1 are imposed, and several possible positions $x_0$ for the first hole are tested (steps 10" and 40"), until positions $x_1$ to $x_N$ are obtained that are consistent with the length L'. In this case, too, the calculation steps 20 and 30 are identical to those set out with reference to FIG. 4a.

In the three previous algorithms, two of the three parameters are fixed, and the value of the third parameter, which permits positions to be obtained for orifices which are consistent with the length L', is determined. Other algorithms in which only one or no parameter is fixed at the outset, may nevertheless be developed without departing from the scope of the present invention.

Certain additional constraints may be taken into consideration advantageously depending on the precise configuration of the wiper in question:

Thus, in the case of configurations of the "flat-blade" type, such as those previously described with reference to FIG. 1, end connectors (not illustrated) are generally provided in order to retain the spine 3 in the interior of the support frame. In such a case, the spraying orifices cannot be distributed over the totality of the length L of the wiper, but only on a portion of the length L' corresponding as a maximum to the total length of the wiper less any parts intended to receive the end connectors.

Furthermore, in such configurations, a linking element or connector is also mounted on the support frame in order to permit the connection of the wiper to a driving arm. The connector is then provided with a hydraulic function with channels for supplying the liquid to the ramps, and it is possible to make provision for the aerodynamic part of the wiper to be realized in two halves, which are fixed to the support frame to either side of the connector in such a way that the supply channels of the wiper are aligned with the supply channels of the connector. An example of such a wiper is described, for example, in document WO 2010/006775 in the name of the applicant. For configurations such as these, the distribution of the spraying orifices may be calculated according to the algorithms of the present invention, by omitting the part intended to receive the connector.

It is also possible to make provision for the interval between two successive spraying orifices not to exceed a certain limit value, or to lie between two limit values.

Figure 6:
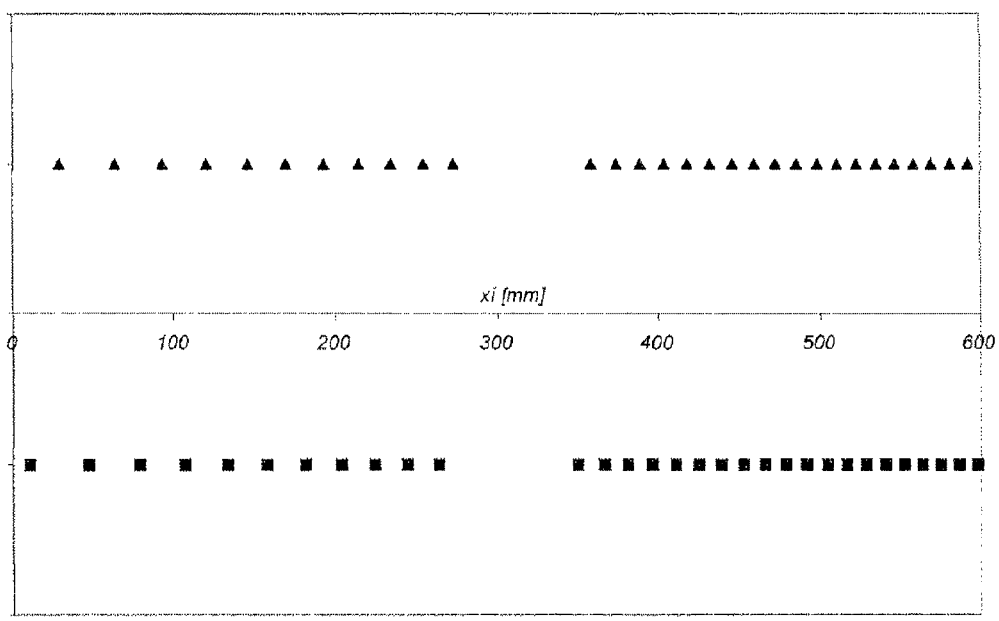
FIGS. 6 to 8 illustrate the results of simulation obtained in accordance with the invention for a bi-ramp wiper adapted to be displaced according to a circular or elliptical trajectory movement.
Figure 7:
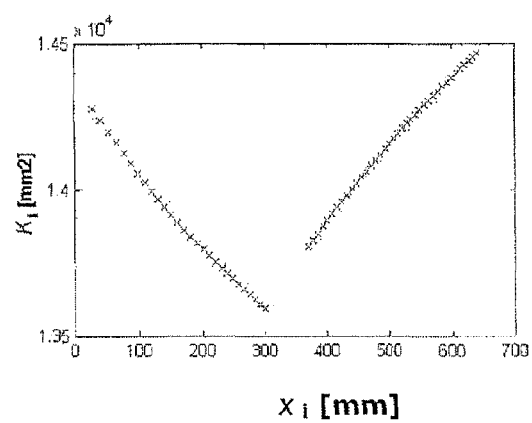
Figure 8:
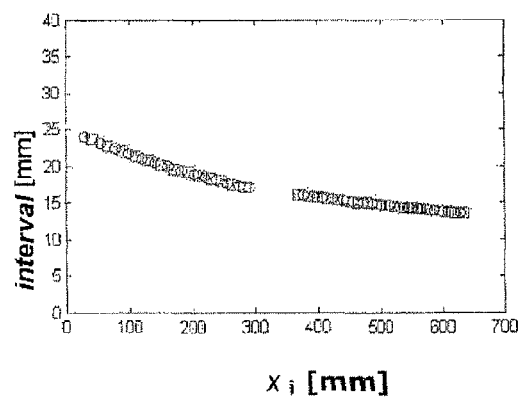

FIGS. 6 to 8 illustrate the results of calculation obtained according to the invention for the distribution of the spraying orifices over the two sides of a wiper utilizing two spoiler halves to either side of a connector:

In FIG. 6, the triangles represent the position of the spraying orifices on one side of the wiper, and the squares represent the position of the spraying orifices on the other side of the wiper. As can be seen, the central part, intended to receive the connector, does not contain any spraying orifices. Furthermore, the spraying orifices have greater spacing towards the bottom of the wiper ($x_i$ weak) than towards the top of the wiper ($x_i$ strong), which permits compensation to be made for the difference in linear speed. Finally, the spraying orifices situated on the same side of the wiper are alternated, in an advantageous manner, in relation to the spraying orifices situated on the other side of the wiper. The chances that an impurity that is not cleaned during the first wiping of the screen will be removed during the second passage of the wiper during one and the same wiping cycle are thus increased.

FIG. 7 shows the target value K obtained for each of the positions calculated for the spraying orifices. It will be appreciated that this target value is substantially constant (here comprised between $1.35 \times 10^4$ and $1.45 \times 10^4$ mm$^2$). Finally, FIG. 8 represents the variations in the interval between the spraying orifices. It will be appreciated in this figure that the distance separating two successive orifices is always comprised between 15 and 25 millimeters.

The invention has been described in the context of a flat wiper designated as second generation, comprising a support frame into which a spine is inserted longitudinally, although the invention similarly finds an application for flat wipers designated as first generation.

These first-generation flat wipers generally comprise a support frame extending longitudinally, which is constituted in its lower part by a strip forming a blade intended to rub against the screen to be wiped, and in its upper part by a locating heel provided with a deflector. Stiffening spines (generally being two in number) are each accommodated in a complementary groove realized in a lateral edge of the heel.

As in the case of flat wipers of the second generation, the deflector contains integrated channels for supplying the washing liquid.

Furthermore, although the invention has been described in the case of a particular figure, in which the wiper is intended to be displaced according to a circular or elliptical trajectory, the principle of the invention is applicable to other types of trajectories and is of interest as soon as the trajectory means that not all points of the wiper cover the same distance during a wiping cycle.

The invention claimed is:

1. A screen wiper for a motor vehicle screen comprising:
   a support frame configured to move between a first end position and a second end position, wherein the support frame comprises:
      a bottom,
      a top, and
      a length disposed between the bottom and the top;
   a wiper blade attached to the support frame; and
   a spraying device, attached to the support frame, comprising:
      a first set of spraying orifices, disposed along the length of the support frame, configured to spray a cleaning liquid in a front of the support frame when the support frame moves from the first end position to the second end position, and
      a second set of spraying orifices, disposed along, the length of the support frame, configured to spray the cleaning liquid in a back of the support frame when the support frame moves from the first end position to the second end position, wherein a spacing between each orifice of the first set of spraying orifices increases along a length of the support frame, wherein a spacing between each orifice of the second set of spraying orifices increases along a length of the support frame.

2. The screen wiper according to claim 1, wherein the top of the support frames moves at a first speed when the support frame moves between the first end position and the second end position, wherein the bottom of the support frames moves at a second speed when the support frame moves between the first end position and the second end position, wherein the first speed is larger than the second speed.

3. The screen wiper according to claim 1, orifices of the first set of spraying orifices and orifices of the second set of spraying orifices are disposed at locations along a length of the support frame so that each orifice of the first set of spraying orifices is separated from each other orifice of the first set of spraying orifices by an orifice of the second set of spraying orifices.

4. The screen wiper according to claim 1, wherein the support frame follows a trajectory that is circular or elliptical when moving from the first end position to the second end position, and wherein a distance separating two successive orifices of the first set of orifices is selected by the solution of the following system of equations $$ax_i^2 - ax_ix_{i-1} + bx_i - bx_{i-1} = K$$

$$\sum_{j=0}^{N} \Delta x_i = x_N - x_0 = L',$$

in which K corresponds to a target value, N−1 corresponds to the total number of spraying orifices, $x_i$ corresponds to the position of an orifice along the length of the support frame, L' corresponds to the length of a part along which the orifices of the first set of orifices are distributed, and $\Delta x_i$ represents the distance separating two consecutive spraying orifices of the first set of orifices.

5. The screen wiper according to claim 4, wherein the solution of the equation system, for a fixed number of spraying orifices and a target value K, consists of varying the value of the position $x_0$ of the first orifice until the set of positions $x_1$ to $x_N$ of the system solution is found, and for which $$x_N - x_0 \leq L'.$$

6. The screen wiper according to claim 4, wherein the solution of the equation system, for a fixed target value and a position $x_0$ of the first orifice, consists of varying the number N until the set of the positions $x_1$ to $x_N$ of the system solution is found, and for which $$x_N - x_0 \leq L'.$$

7. The screen wiper according to claim 4, wherein the solution of the equation system, for a fixed number of spraying orifices and a position $x_0$ of the first orifice, consists of varying the target value K until the set of the positions $x_1$ to $x_N$ of the system solution is found, and for which $$x_N - x_0 \leq L'.$$

* * * * *